United States Patent
Park

(10) Patent No.: US 10,998,793 B2
(45) Date of Patent: May 4, 2021

(54) MOTOR FOR DRONE AND DRONE INCLUDING SAME

(71) Applicant: LG INNOTEK CO., LTD., Seoul (KR)

(72) Inventor: Young Dae Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 147 days.

(21) Appl. No.: 16/317,403

(22) PCT Filed: Jul. 12, 2017

(86) PCT No.: PCT/KR2017/007443
§ 371 (c)(1),
(2) Date: Jan. 11, 2019

(87) PCT Pub. No.: WO2018/012867
PCT Pub. Date: Jan. 18, 2018

(65) Prior Publication Data
US 2019/0252938 A1    Aug. 15, 2019

(30) Foreign Application Priority Data

Jul. 12, 2016    (KR) .................... 10-2016-0087834

(51) Int. Cl.
| | |
|---|---|
| *H02K 5/10* | (2006.01) |
| *H02K 9/06* | (2006.01) |
| *H02K 7/14* | (2006.01) |
| *H02K 5/20* | (2006.01) |
| *B64C 27/08* | (2006.01) |
| *B64C 39/02* | (2006.01) |

(Continued)

(52) U.S. Cl.
CPC .............. *H02K 5/10* (2013.01); *B64C 25/32* (2013.01); *B64C 27/08* (2013.01); *B64C 27/12* (2013.01);
(Continued)

(58) Field of Classification Search
CPC .............. H02K 7/14; H02K 5/18; H02K 9/06
(Continued)

(56) References Cited

U.S. PATENT DOCUMENTS

2014/0111040 A1    4/2014    Badafem et al.

FOREIGN PATENT DOCUMENTS

| CN | 204361855 | 5/2015 |
|---|---|---|
| CN | 204669155 | 9/2015 |

(Continued)

OTHER PUBLICATIONS

Machine Translation WO2016066009 (Year: 2016).*

(Continued)

*Primary Examiner* — Jose A Gonzalez Quinones
(74) *Attorney, Agent, or Firm* — KED & Associates LLP

(57) ABSTRACT

The present invention provides a motor for a drone, comprising: a rotary shaft; a stator including a hole into which the rotary shaft is inserted; and a rotor arranged on the outer side of the stator, wherein the rotor comprises: a cover part coupled to the rotary shaft so as to cover the upper portion of the stator; a body part for covering a side portion of the stator; and a magnet coupled to the inner circumferential surface of the body part, wherein the cover part comprises: a propeller coupling part including a hole through which the rotary shaft penetrates; an upper surface part connected to the body part; a connecting part for connecting the propeller coupling part and the upper surface part; and a plurality of blades arranged in the radial direction from the lateral surface of the propeller coupling part and formed so as to be spaced apart from the upper surface part. Therefore, the present invention provides the advantageous effects of preventing water or foreign material from permeating into the motor while ensuring an air passage for heat dissipation.

10 Claims, 20 Drawing Sheets

(51) Int. Cl.
  *B64C 27/12*  (2006.01)
  *B64C 25/32*  (2006.01)
  *F04D 25/08*  (2006.01)

(52) U.S. Cl.
  CPC ............ *B64C 39/02* (2013.01); *B64C 39/024* (2013.01); *F04D 25/08* (2013.01); *H02K 5/20* (2013.01); *H02K 7/14* (2013.01); *H02K 9/06* (2013.01); *B64C 2201/162* (2013.01)

(58) Field of Classification Search
  USPC .................................. 310/62, 63, 88, 156.01
  See application file for complete search history.

(56) References Cited

FOREIGN PATENT DOCUMENTS

| | | | |
|---|---|---|---|
| JP | 2009-106079 | | 5/2009 |
| JP | 2009106079 A | * | 5/2009 |
| JP | 2015-139225 | | 7/2015 |
| JP | 2015139225 A | * | 7/2015 |
| KR | 2016-0000375 | | 1/2016 |
| KR | 101619836 | | 5/2016 |
| WO | WO-2016066009 A1 | * | 5/2016 ............... H02K 9/06 |

OTHER PUBLICATIONS

Chinese Office Action dated Apr. 9, 2020 issued in Application No. 201780043636.6.
International Search Report (with English Translation) and Written Opinion dated Oct. 23, 2017 issued in Application No. PCT/KR2017/007443.

* cited by examiner

MOTOR FOR DRONE AND DRONE INCLUDING SAME

CROSS-REFERENCE TO RELATED PATENT APPLICATIONS

This application is a U.S. National Stage Application under 35 U.S.C. § 371 of PCT Application No. PCT/KR2017/007443, filed Jul. 12, 2017, which claims priority to Korean Patent Application No. 10-2016-0087834, filed Jul. 12, 2016, whose entire disclosures are hereby incorporated by reference.

TECHNICAL FIELD

The present invention relates to a motor for a drone and a drone including the same.

BACKGROUND ART

A drone is an unmanned aerial vehicle having a plurality of propellers mounted on a drone main body thereof to fly. The drone main body of the drone includes a motor configured to drive the propellers. In the motor, a rotor rotates due to electrical interaction with a stator to drive the propellers.

The rotor may be disposed at the outside of the stator to raise an output of the motor. In the above-described motor, a large amount of heat is generated therein. Accordingly, a heat dissipation structure in which the inside of the motor communicate with the outside thereof should be implemented. However, since the motor is exposed to the outside due to the heat dissipation structure, water or foreign substances can be introduced into the motor according to a flight environment.

DISCLOSURE

Technical Problem

The present invention is directed to providing a motor for a drone capable of securing an air flow path for heat dissipation and preventing water or foreign substances from being introduced into the motor, and a drone including the same.

A problem desired to be solved by the embodiment is not limited to the above-mentioned problem, and other problems which are not mentioned may be clearly understood by those skilled in the art from a disclosure which will be described below.

Technical Solution

One aspect of the present invention provides a motor for a drone including a rotary shaft, a stator including a hole into which the rotary shaft is inserted, and a rotor disposed at an outside of the stator, wherein the rotor includes a cover part coupled to the rotary shaft to cover an upper portion of the stator, a body part configured to cover a side portion of the stator, and a magnet coupled to an inner circumferential surface of the body part, wherein the cover part includes a propeller coupling part including a hole through which the rotary shaft passes, an upper surface part connected to the body part, a connecting part configured to connect the propeller coupling part and the upper surface part, and a plurality of blades disposed in a radial direction from a side surface of the propeller coupling part and formed to be spaced apart from the upper surface part.

The connecting part may be provided with a plurality of connecting parts, and through holes may be disposed between the plurality of connecting parts.

The blades may be located above the through hole.

The blade may include a surface concavely curved toward the through hole.

The blade may include a surface convexly curved toward the through hole.

The blade may include a flat surface.

An upper surface of the propeller coupling part may be disposed to be higher than an upper surface of the cover part.

The connecting part and the upper surface part may be integrally formed.

The cover part and the body part may be integrally formed.

Another aspect of the present invention provides a motor for a drone including a rotary shaft, a stator including a hole into which the rotary shaft is inserted, and a rotor disposed at an outside of the stator, wherein the rotor includes a cover part coupled to the rotary shaft to cover an upper portion of the stator, a body part configured to cover a side portion of the stator, and a magnet coupled to an inner circumferential surface of the body part, wherein the cover part includes a propeller coupling part including a hole through which the rotary shaft passes, an upper surface part connected to the body part, and a plurality of blades disposed in a radial direction from a side surface of the propeller coupling part and connected to the upper surface part, wherein one surface of the blade is a horizontal surface, and the other surface of the blade is an inclined surface.

The other surfaces of blades may be disposed at both sides of the one surface, and an inclination direction of the other surface disposed at the one side and an inclination direction of the other surface disposed at the other side may be the same.

The one surface of the blade may be disposed to be coplanar with the upper surface part.

The one surface may be disposed to have a width which gradually increases toward the outside thereof on the basis of a radial direction.

An upper surface of the propeller coupling part may be disposed to be higher than an upper surface of the cover part.

The cover part and the body part may be integrally formed.

Still another aspect of the present invention provides a motor for a drone including a rotary shaft, a stator including a hole into which the rotary shaft is inserted, and a rotor disposed at an outside of the stator, wherein the rotor includes a cover part coupled to the rotary shaft to cover an upper portion of the stator, a body part configured to cover a side portion of the stator, and a magnet coupled to an inner circumferential surface of the body part, wherein the cover part includes a propeller coupling part including a hole through which the rotary shaft passes, an upper surface part connected to the body part, a connecting part configured to connect the propeller coupling part and the upper surface part, and a plurality of blades disposed in a radial direction from a side surface of the propeller coupling part and connected to the upper surface part, wherein an upper surface of the blade is disposed to be higher than an upper surface of the connecting part.

An upper surface of the blade may be a flat surface, and each of side surfaces of the blade may include an inclined surface.

Each of both side surfaces of the blade may include the inclined surface, and the inclined surfaces of both side surfaces may have different inclination directions.

In a cross-sectional shape of the blade, both lateral sides may be symmetrically disposed on the basis of a base line which vertically passes through a center of a width of an upper side of the blade.

A lower surface of the blade may be disposed to be lower than the upper surface of the connecting part.

An upper surface of the propeller coupling part may be disposed to be higher than an upper surface of the cover part.

The upper surface of the blade may be disposed to be coplanar with the upper surface of the propeller coupling part.

The connecting part may be provided with a plurality of connecting parts, and through holes may be disposed between a plurality of connecting parts.

The blade may be disposed above the through hole.

The through hole may be located at the inside of an outer boundary of the upper surface of the blade.

Upper surfaces of the plurality of connecting parts may be disposed to be coplanar with each other.

A width of the upper surface of the blade may be formed to gradually increase toward the outside thereof on the basis of a radial direction.

The cover part and the body part may be integrally formed.

Yet another aspect of the present invention provides a drone including a drone main body, a landing part coupled to a lower part of the drone main body, a plurality of propeller supporters configured to radially extend from the drone main body, a motor coupled to the propeller supporter; and a propeller coupled to the motor, wherein the motor includes a rotary shaft, a stator including a hole into which the rotary shaft is inserted, and a rotor disposed at the outside of the stator, wherein the rotor includes a cover part coupled to the rotary shaft to cover an upper portion of the stator, a body part configured to cover a side portion of the stator, and a magnet coupled to an inner circumferential surface of the body part, wherein the cover part includes a propeller coupling part including a hole through which the rotary shaft passes, an upper surface part connected to the body part, a connecting part configured to connect the propeller coupling part and the upper surface part, and a plurality of blades disposed in a radial direction from a side surface of the propeller coupling part and formed to be spaced apart from the upper surface part.

Yet another aspect of the present invention provides a drone including a drone main body, a landing part coupled to a lower part of the drone main body, a plurality of propeller supporters configured to radially extend from the drone main body, a motor coupled to the propeller supporter; and a propeller coupled to the motor, wherein the motor includes a rotary shaft, a stator including a hole into which the rotary shaft is inserted, and a rotor disposed at the outside of the stator, wherein the rotor includes a cover part coupled to the rotary shaft to cover an upper portion of the stator, a body part configured to cover a side portion of the stator, and a magnet coupled to an inner circumferential surface of the body part, wherein the cover part includes a propeller coupling part including a hole through which the rotary shaft passes, an upper surface part connected to the body part, and a plurality of blades disposed in a radial direction from a side surface of the propeller coupling part and connected to the upper surface part, wherein one surface of the blade is a horizontal surface, and the other surface of the blade is an inclined surface.

Yet another aspect of the present invention provides a drone including a drone main body, a landing part coupled to a lower part of the drone main body, a plurality of propeller supporters configured to radially extend from the drone main body, a motor coupled to the propeller supporter; and a propeller coupled to the motor, wherein the motor includes a rotary shaft, a stator including a hole into which the rotary shaft is inserted, and a rotor disposed at the outside of the stator, wherein the rotor includes a cover part coupled to the rotary shaft to cover an upper portion of the stator, a body part configured to cover a side portion of the stator, and a magnet coupled to an inner circumferential surface of the body part, wherein the cover part includes a propeller coupling part including a hole through which the rotary shaft passes, an upper surface part connected to the body part, a connecting part configured to connect the propeller coupling part and the upper surface part, and a plurality of blades disposed in a radial direction from a side surface of the propeller coupling part and connected to the upper surface part, wherein an upper surface of the blade is disposed to be higher than an upper surface of the connecting part.

Advantageous Effects

According to an embodiment, a motor is configured so that inner air can be discharged to the outside of the motor, and an air flow path for heat dissipation is secured and introduction of water or foreign substances into the motor is prevented by including a cover part configured to cover an upper part of a stator.

According to the embodiment, since a flow of air discharge is promoted by blades disposed adjacent to through holes, a heat dissipation effect is significantly improved.

According to the embodiment, since heights of the blades are varied, a heat dissipation effect is significantly improved by increasing an amount of an air flow introduced from under propellers.

MODES OF THE INVENTION

Hereinafter, embodiments of the present invention will be described in detail with reference to the accompanying drawings. Purposes, particular advantages, and new characteristic of the present invention may become more apparent from the following detailed description related to the accompanying drawings and the embodiment. Further, terms and words used in the specification and the claims should not interpreted as usual or dictionary meaning, and should be interpreted as meaning and concepts which coincide with technical spirit of the present invention on the basis of a principle in which an inventor may appropriately define the concepts of the terms to describe the invention thereof in an optimal method. In addition, while describing the present invention, a detailed description for a related technology which may unnecessarily obscure the spirit of the present invention will be omitted.

Figure 1:
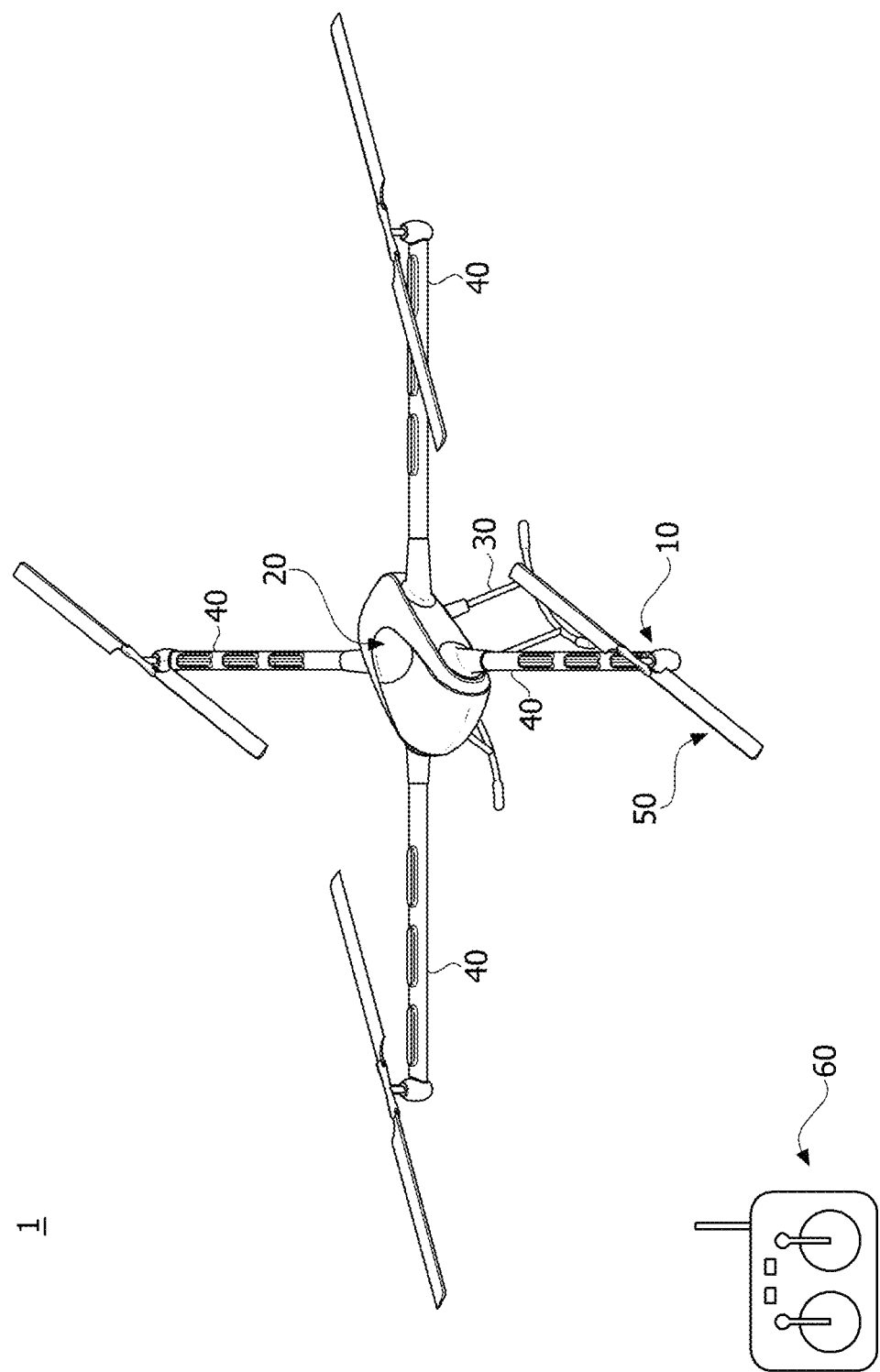
FIG. 1 is a view illustrating a drone according to an embodiment.

FIG. 1 is a view illustrating a drone according to an embodiment.

Referring to FIG. 1, a drone 1 according to the embodiment may include a motor 10 for a drone, a drone main body 20, a landing part 30, a propeller supporter 40, a propeller 50, and a controller 60.

The drone main body 20 forms an exterior of the drone 1. The drone main body 20 includes a plurality of propeller supporters 40. The plurality of propeller supporters 40 are radially disposed on the drone main body 20. Each of the propeller supporters 40 may include the motor 10 for a drone. The propeller 50 is mounted on each of the motors for a drone 10. Further, a wireless controller 60 configured to control the driving of the motors for a drone 10 may be included.

The plurality of propellers 50 may be symmetrically disposed on the basis of a center of the drone main body 20. Further, a rotating direction of the motor 10 for a drone may be determined so that a clockwise direction and a counter-clockwise direction may be combined in rotating directions of the plurality of propellers 50. The rotating directions of the propellers 50 symmetrical to each other on the basis of the center of drone main body 20 may be set to be the same (for example, the clockwise direction). Further, the pair of other propellers 50 may have opposite rotating directions in contrast with the above (for example, the counterclockwise direction).

Figure 2:
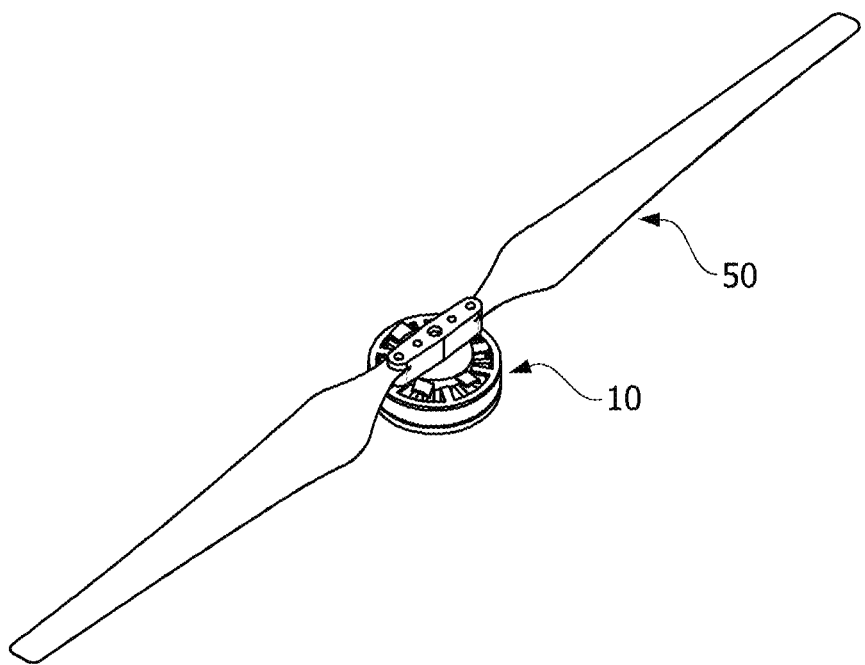
FIG. 2 is a view illustrating a motor coupled with a propeller according to a first embodiment.
Figure 3:
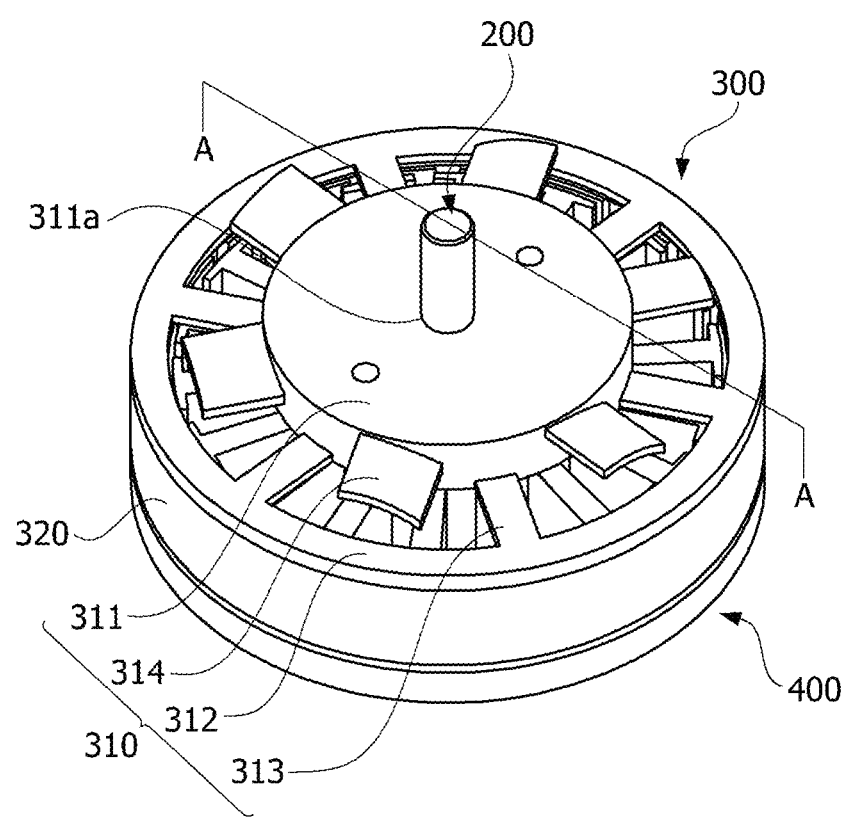
FIG. 3 is a view illustrating the motor according to the first embodiment.
Figure 4:
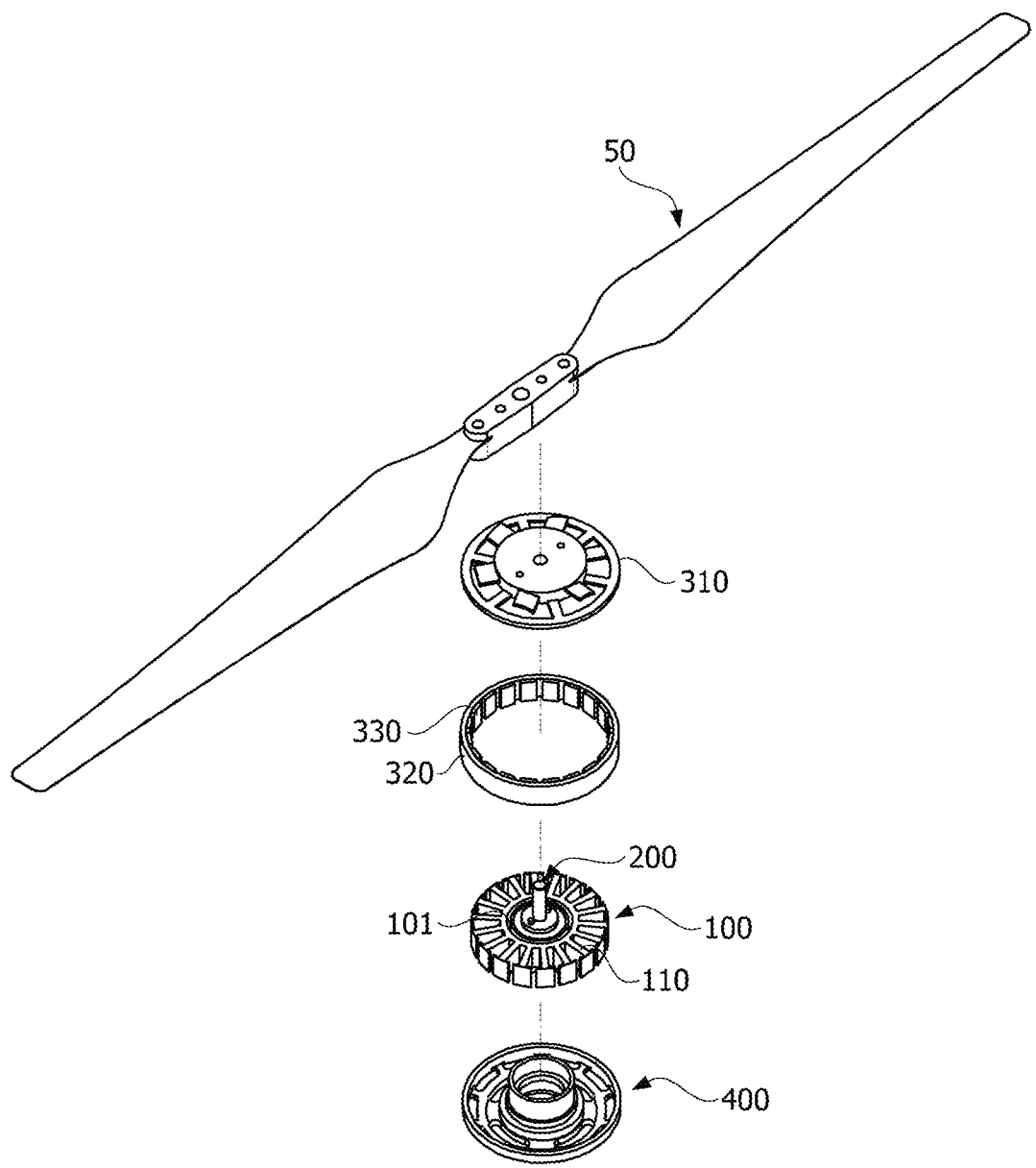
FIG. 4 is an exploded perspective view of the motor shown in FIG. 2.

FIG. 2 is a view illustrating the motor coupled with the propeller according to a first embodiment, FIG. 3 is a view illustrating the motor according to the first embodiment, and FIG. 4 is an exploded perspective view of the motor shown in FIG. 2.

Referring to FIGS. 2 to 4, the motor 10 may include a stator 100, a rotary shaft 200, a rotor 300, and a housing 400.

The stator 100 induces rotation of the rotor 300 by causing electrical interaction with the rotor 300. The stator 100 may include a stator core 110 and a coil 120. The coil 120 may be wound around the stator core 110 to cause the electrical interaction with the rotor 300. A detailed configuration of the stator 100 will be described below.

The stator 100 may include the stator core 110 including a plurality of teeth. The stator core 110 may include a ring-shaped yoke and the teeth facing outward from the yoke. The teeth may be provided at a predetermined interval along an edge of the yoke. Meanwhile, a plurality of plates each having a thin steel sheet shape may be stacked to form the stator core 110. Alternatively, the stator core 110 may include a single part formed in a tub shape. Further, a plurality of divided cores may be coupled or connected to each other to form the stator core 110. Each of the divided cores may also be formed by a plurality of plates each having a thin steel sheet shape which are stacked or include a single part formed in a tub shape.

A hole 101 may be formed in the stator core 110. The rotary shaft 200 is inserted into the hole 101.

The rotary shaft 200 is disposed to pass through a center of the stator 100. The rotary shaft 200 may be rotatably coupled to the hole 101 of the stator core 110. The rotary shaft 200 is connected to the propellers 50 and a cover part 310 to transfer a driving force of the motor 10 for a drone to the propeller 50.

The rotor 300 is disposed at the outside of the stator 100. The rotor 300 may include the cover part 310, a body part 320, and a magnet 330.

The cover part 310 covers an upper portion of the stator 100. The body part 320 covers a side portion of the stator 100. The cover part 310 and the body part 320 may be formed to entirely surround the stator 100. The above are configurations for preventing prevent water or foreign substances from being introduced into the motor 10 for a drone.

The cover part 310 may include a propeller coupling part 311, an upper surface part 312, connecting parts 313, and blades 314. The propeller coupling part 311, the upper surface part 312, the connecting part 313, and the blades 314 may be integrally formed.

The propeller coupling part 311 is located at a center of the cover part 310. An upper surface of the propeller coupling part 311 may be formed as a flat surface. Further, the propeller coupling part 311 may be formed as an entirely cylindrical shape. The upper surface of the propeller coupling part 311 is a part configured to come into contact and coupled with the propellers 50. A hole 311a may be formed in a center of the propeller coupling part 311. The rotary shaft 200 passes through the hole 311a. The propeller coupling part 311 may include engaging holes 311b. An engaging member, such as a bolt configured to engage the propellers 300 and the cover part 310, is inserted into the engaging hole 311b. A plurality of engaging holes 311b may be symmetrically disposed on the basis of the hole 311a.

The propeller coupling part 311 may be formed to protrude more than the upper surface part 312.

The upper surface part 312 and propeller coupling part 311 are disposed to be spaced apart from each other and connected to the body part 320. The upper surface part 312 is coupled onto the body part 320. Further, the upper surface part 312 may be disposed along an edge of the propeller coupling part 311.

The connecting part 313 is connected between the propeller coupling part 311 and the upper surface part 312 in an arm shape and connects the propeller coupling part 311 and the upper surface part 312. A plurality of connecting parts 313 may be spaced apart from each other at a predetermined interval. Further, the connecting part 313 may radially extend from a side surface of the propeller coupling part 311 to be connected to the upper surface part 312. Through holes 313a are each formed between every two adjacent connecting parts 313.

Since the through holes 313a pass through the cover part 310, the through holes 313a serve to communicate the inside of the motor 10 for a drone with the outside thereof.

The blade 314 is formed to radially extend from the side surface of the propeller coupling part 311. The plurality of blades 314 may be formed. Further, the blades 314 may be spaced apart from the upper surface part 312 to be located above the through holes 313a. The blades 314 induce an air flow so that air in the motor 10 may be discharged to the outside through the through hole 313a or outer air may be introduced into the motor 10.

The body part 320 of the rotor 300 surrounds the side portion of the stator 100. The body part 320 is formed in a pipe shape of which the inside is hollow. The body part 320 is disposed to have an inner circumferential surface which faces the teeth of the stator core 110. The magnet 330 may be attached to the inner circumferential surface of the body part 320. An upper end of the body part 320 may be coupled to the upper surface part 312 of the cover part 310. The body part 320 and the cover part 310 are separately double-injection molded to be integrally manufactured or manufactured as a single part. A lower end of the body part 320 may be coupled to the housing 400.

The magnet 330 is coupled to the inner circumferential surface of the body part 320. The magnet 330 causes electrical interaction with the coil wound around the stator core 110.

Meanwhile, the stator 100 is located between an inner space formed by the above-described cover part 310, body part 320, and housing 400.

Figure 5:
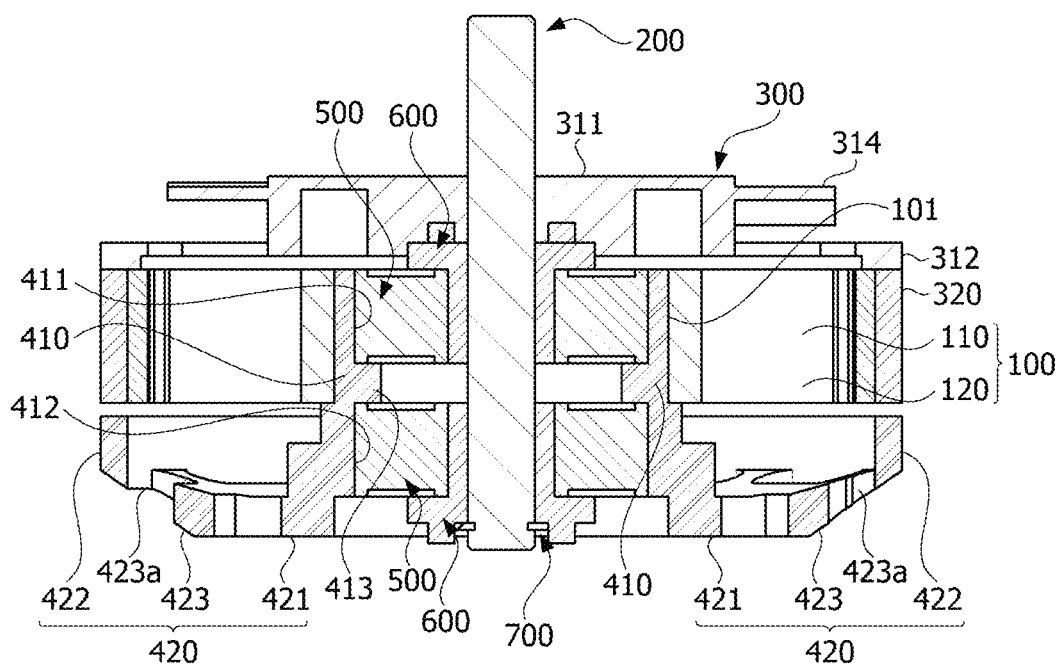
FIG. 5 is a cross-sectional view taken along line A-A of the motor for a drone shown in FIG. 3.

FIG. 5 is a cross-sectional view taken along line A-A of the motor for a drone shown in FIG. 3.

Referring to FIG. 5, bearings 500 may be coupled to an upper portion and a lower portion of the inside of a pillar part 410 of the housing 400. The rotary shaft 200 may be inserted into the bearings 500. In this case, holders 600 may be inserted between the bearings 500 and the rotary shaft 200. The upper holder 600 may be connected to the cover part 310. The stator core 110 may be fitted onto the outside of the pillar part 410.

Figure 6:
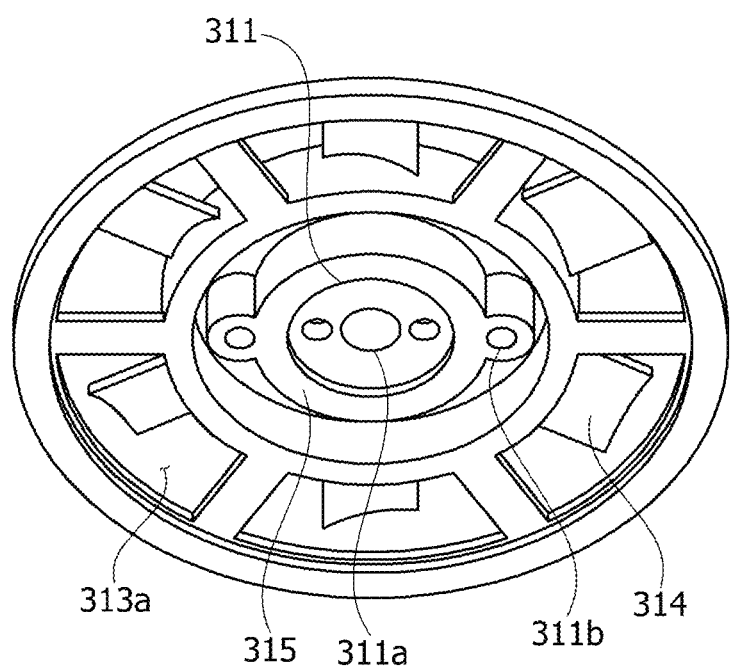
FIG. 6 is a view illustrating a lower surface of a cover part.

FIG. 6 is a view illustrating a lower surface of a cover part.

Referring to FIG. 6, a lower surface of the cover part 310 may include a coupling part 315 formed at a center thereof. The coupling part 315 is a configuration coupled to the holder 600. The coupling part 315 may protrude from the lower surface of the cover part 310. The coupling part 315 may have a center which is concavely formed to secure a space for inserting the holder 600. Further, the coupling part 315 may include a concave or convex connection part to improve coupling with the holder 600.

Figure 7:
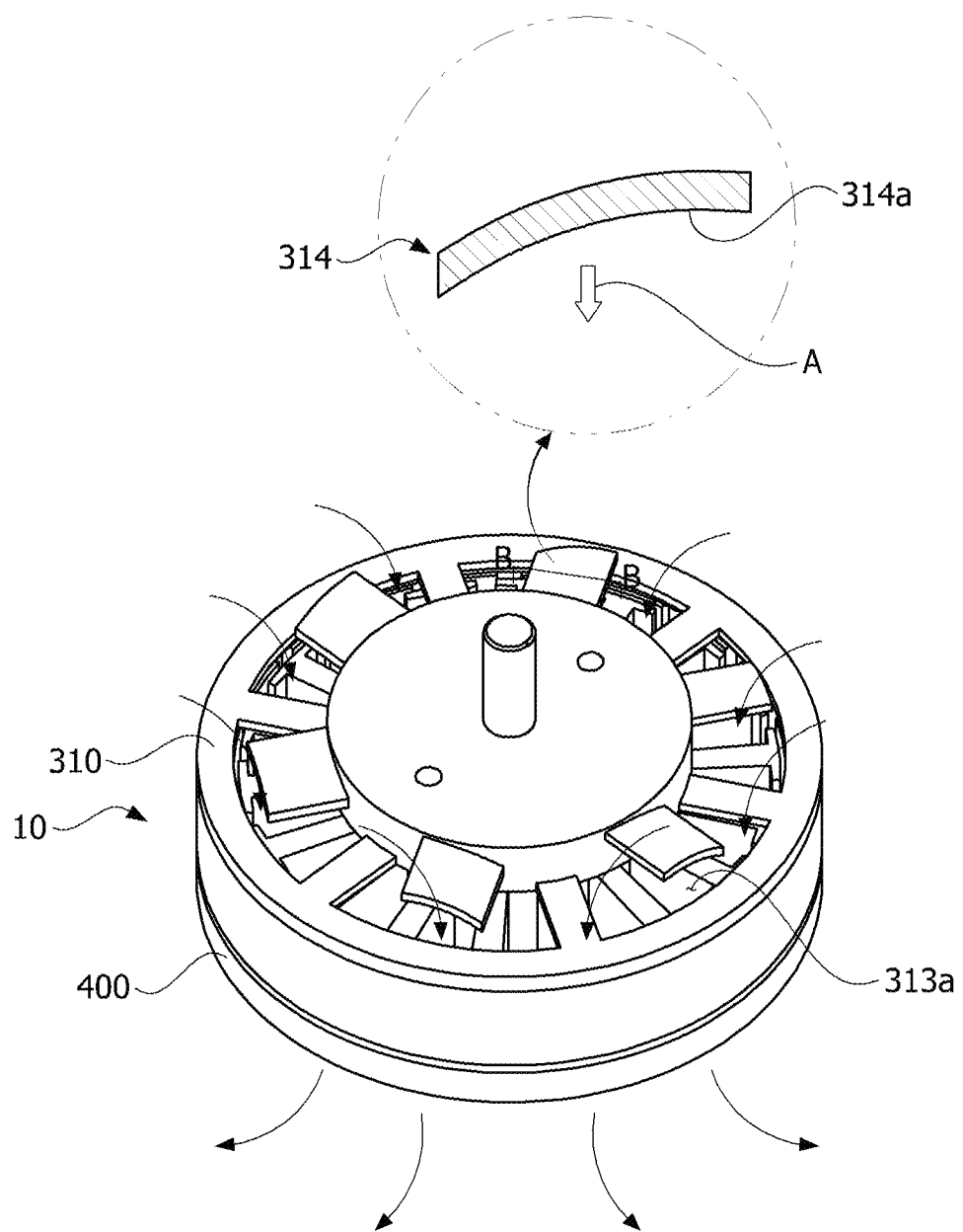
FIG. 7 is a view illustrating a cross-sectional surface of a blade.

FIG. 7 is a view illustrating a cross-sectional surface of the blade.

The blade 314 may include a curved surface or a flat surface.

Referring to FIG. 7, the blade 314 may include a curved surface 314a formed to be concave toward the through hole 313a in the same direction as a direction A in FIG. 7. The blade 314 suctions air above the cover part 310 to induce a flow of air which is discharged to a lower side of the housing 400.

Specifically, when the motor 10 for a drone rotates, the blade 314 rotates. The rotating blade 314 suctions outer air through the through hole 313a, and the air suctioned through the through hole 313a passes through the inside of the motor 10 and is discharged through the housing 400 which is located under the motor 10. In this process, heated generated from the inside of the motor 10 for a drone is discharged to the outside.

Figure 8:
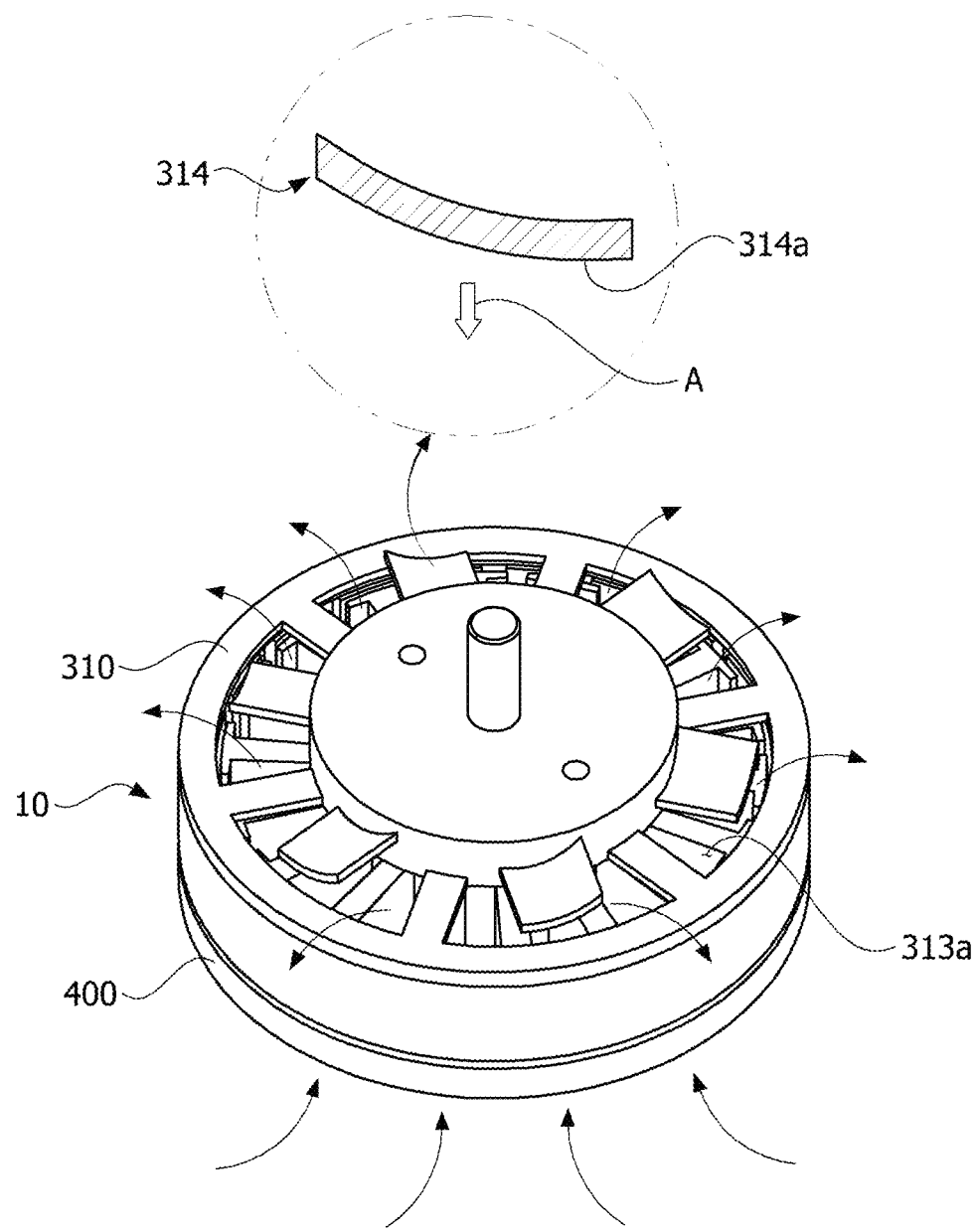
FIG. 8 is a view illustrating a cross-sectional surface of a blade having another shape.

FIG. 8 is a view illustrating a cross-sectional surface of a blade having another shape.

Referring to FIG. 8, the blade 314 may include a curved surface 314a formed to be convex toward the through hole 313a in the same direction as a direction A in FIG. 8. The blade 314 suctions air under the housing 400 to induce a flow of air which is discharged to an upper side of the cover part 310.

Figure 9:
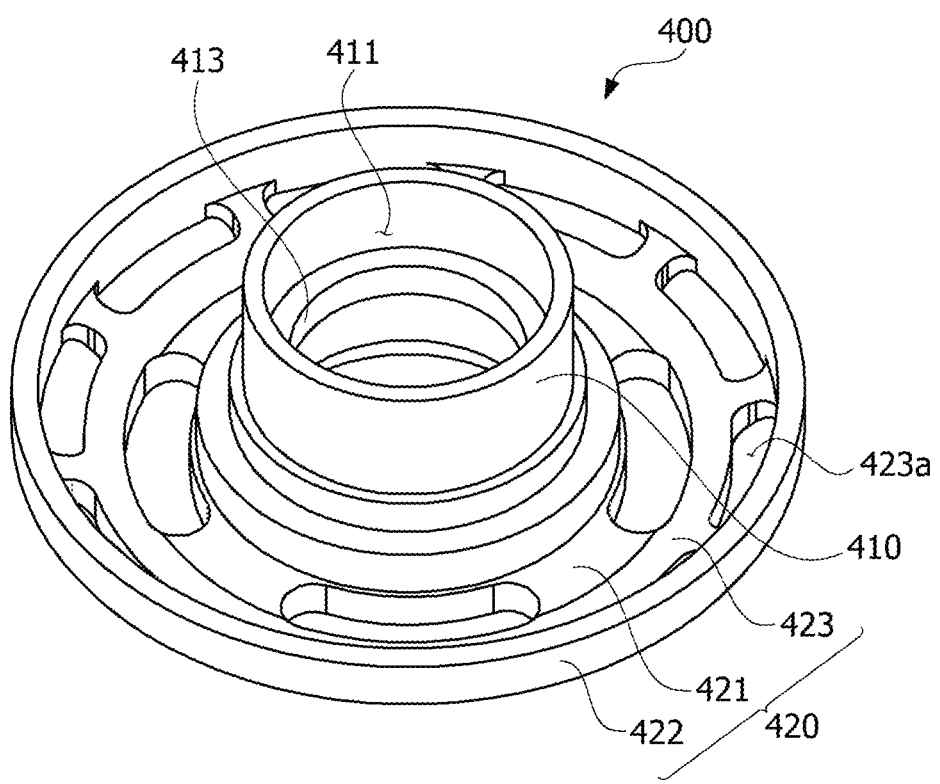
FIG. 9 is a view illustrating a housing.
Figure 10:
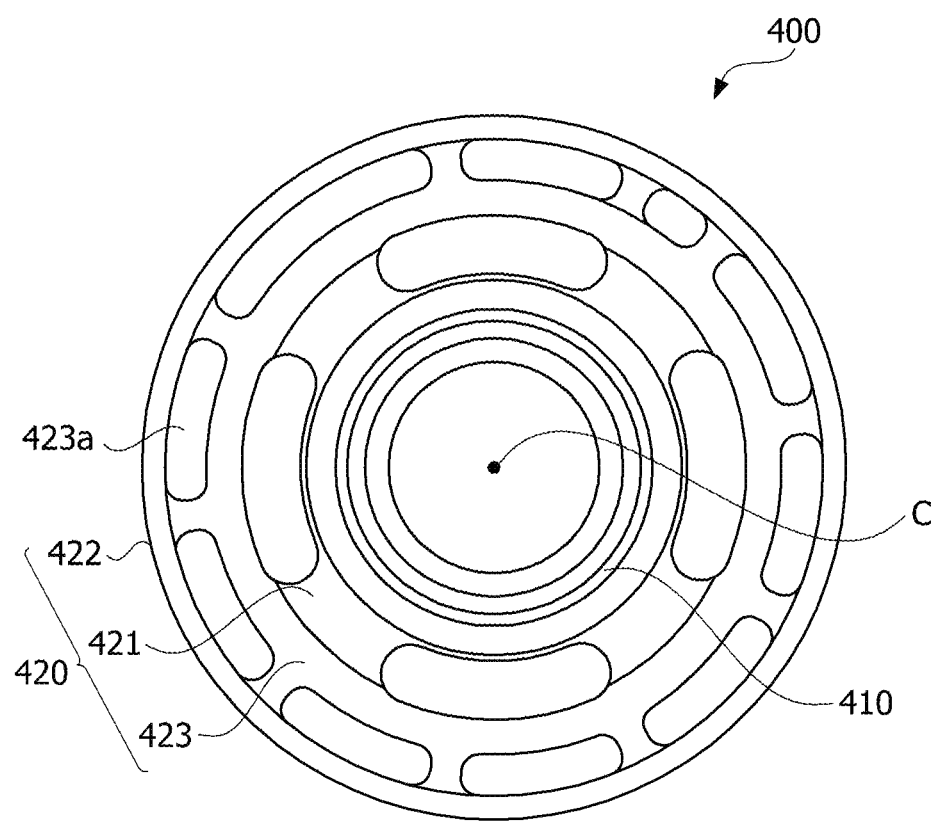
FIG. 10 is a view illustrating a bottom surface of the housing shown in FIG. 9.

FIG. 9 is a view illustrating the housing, and FIG. 10 is a view illustrating a bottom surface of the housing shown in FIG. 9.

Referring to FIGS. 5, 9 and 10, the housing 400 may include the pillar part 410 and a flange part 420.

The pillar part 410 has a center hole formed therein to provide a space, and the stator core 110 may be coupled to the outside of the pillar part 410. Pocket parts 411 may be provided in the pillar part 410. The pocket parts may be provided on an upper part and a lower part of the pillar part 410. The pocket part may include a first pocket 411 and a second pocket 412. A rib 411a may protrude from an inner circumferential surface of the pillar part 410, and on the basis of the rib 411a, the first pocket 411 may be provided on the rib 411a and the second pocket 412 may be provided under the rib 411a. The bearing 500 may be mounted on each of the first pocket 411 and the second pocket 412.

The flange part 420 extends from a lower end of the pillar part 410 in a radial direction to cover the stator 100. The flange part 420 may include a floor part 421, a side wall 422, and a connecting part 423. The floor part 421, the side wall 422, and the connecting part 423 may be classified according to shapes and functional characteristics to be described and are one part vertically connected to each other.

The floor part 421 extends from the lower end of the pillar part 410. The side wall 422 is disposed to be spaced apart from the floor part 421. The connecting part 423 connects the floor part 421 and the side wall 422. In this case, the connecting part 423 may be formed to be inclined.

Further, the connecting part 423 may include the through hole 423a. The plurality of through hole 423a may be provided. The through holes 423a of the housing 400 may be arranged with the through holes 313a of the cover part 310 in a radial direction on the basis of a center C of the motor 10 for a drone. When the motor 10 for a drone rotates, outer air may be suctioned into the motor 10 for a drone through the through holes 423a. Conversely, the air in the motor 10 for a drone may be discharged to the outside through the through holes 423a according to a direction of the blade 314 and the rotating direction of the motor 10 for a drone.

Figure 11:
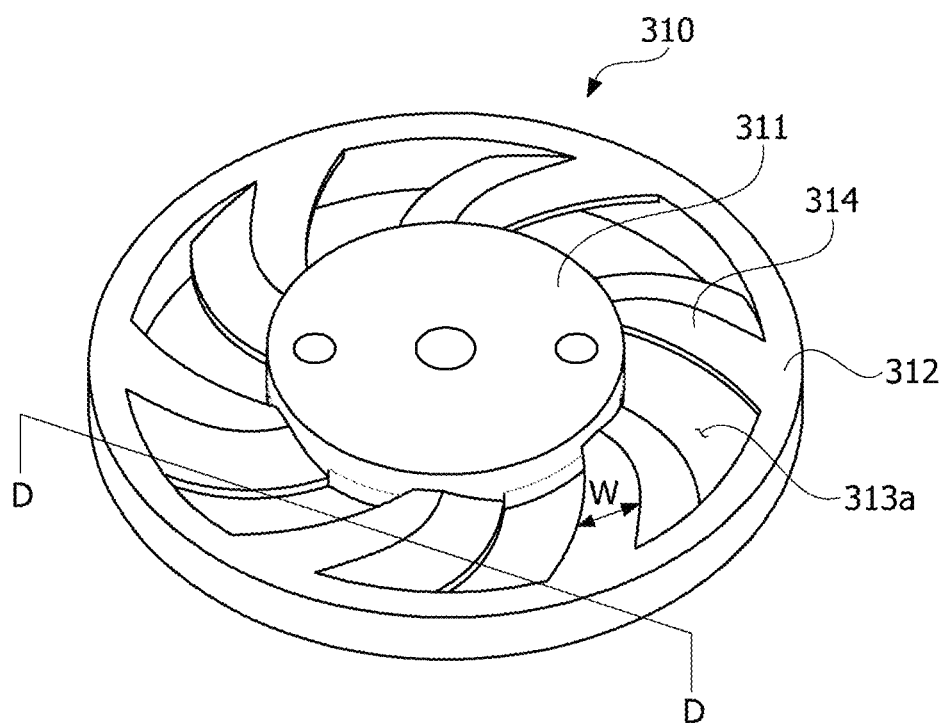
FIG. 11 is a view illustrating a cover part of a motor according to a second embodiment.
Figure 12:
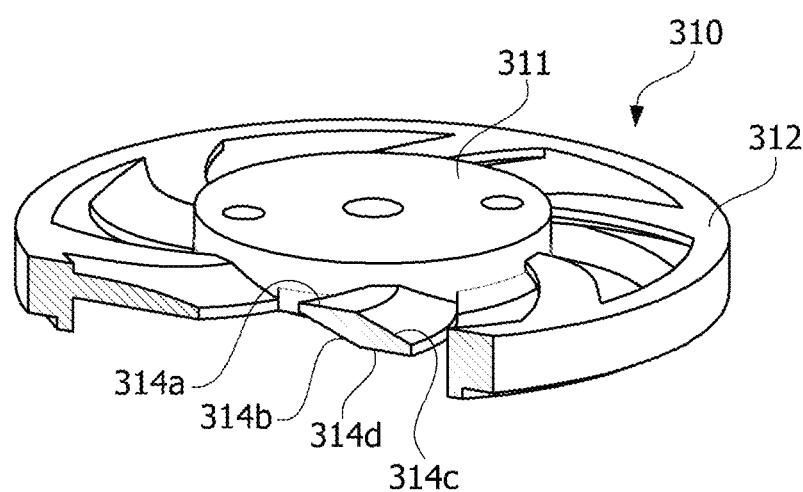
FIG. 12 is a cross-sectional view taken along line D-D of the cover part shown in FIG. 11.

FIG. 11 is a view illustrating a cover part of a motor according to a second embodiment, and FIG. 12 is a cross-sectional view taken along line D-D of the cover part in FIG. 11.

Referring to FIGS. 11 and 12, a cover part 310 of the motor for a drone according to the second embodiment may include a propeller coupling part 311, an upper surface part 312, and blades 314.

The blades 314 are formed on a side surface of the propeller coupling part 311 in a radial direction and connected to the upper surface part 312. In this case, one surface of the blade 314 may be a horizontal surface, and the other surface thereof may be an inclined surface. For example, the upper surface 314a of the blade 314 may be a horizontal surface. Further, the blade 314 and the upper surface 314a may be formed to be coplanar with the upper surface part 312. In addition, both side surfaces 314b and 314c of the blade 314 may be inclined surfaces. In addition, inclination directions of both side surfaces 314b and 314c of the blade 314 may be the same.

Meanwhile, a width w of the upper surface 314a of the blade 314 may be formed to gradually increase toward the outside thereof on the basis of a radial direction of the cover part 310.

Figure 13:
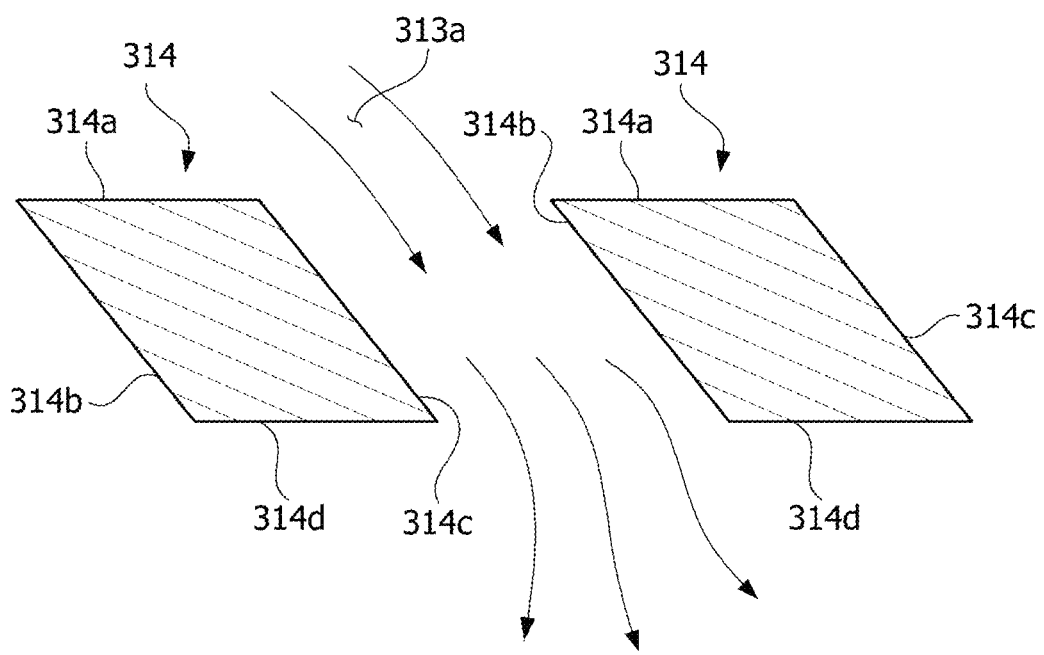
FIG. 13 is a view illustrating an air flow implemented by the blade shown in FIG. 11.

FIG. 13 is a view illustrating an air flow implemented by the blade shown in FIG. 11.

Referring to FIG. 13, when the blade 314 rotates, air above the blade 314 is suctioned along both inclined side surfaces 314b and 314c and passes through a through hole 313a to be introduced into the motor 10 for a drone.

Figure 14:
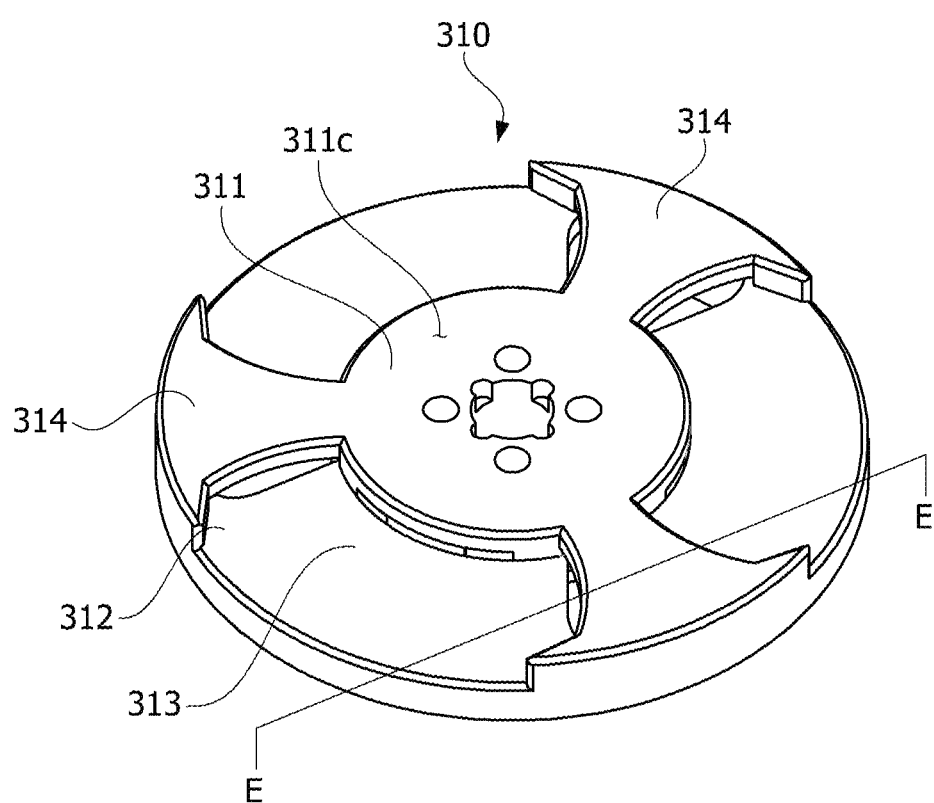
FIG. 14 is a view illustrating a cover part of a motor for a drone according to a third embodiment.
Figure 15:
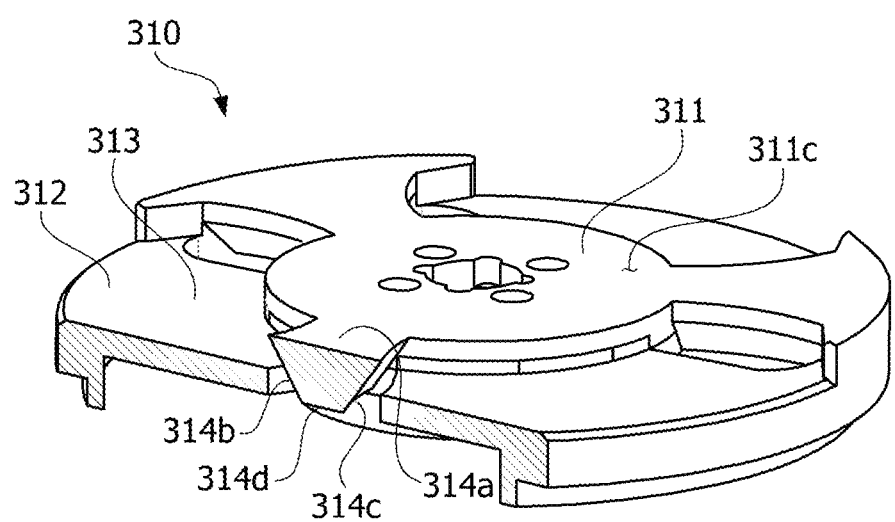
FIG. 15 is a cross-sectional view taken along line E-E of the cover part shown in FIG. 14.

FIG. 14 is a view illustrating a cover part of a motor for a drone according to a third embodiment, and FIG. 15 is a cross-sectional view taken along line E-E of the cover part shown in FIG. 14.

Referring to FIGS. 14 and 15, a cover part 310 may include a propeller coupling part 311, an upper surface part 312, connecting parts 313, and blades 314.

The upper surface part 312 is connected to the body part 320 (see FIG. 3). Further, the connecting part 313 connects the upper surface part 312 and the propeller coupling part 311. The plurality of connecting part 313 may be provided, and through holes 313a may be formed between the connecting parts 313. The blade 314 may be disposed on the through hole 313a. An upper surface 311c of the propeller coupling part 311 may be formed to be higher than the upper surface part 312.

Figure 16:
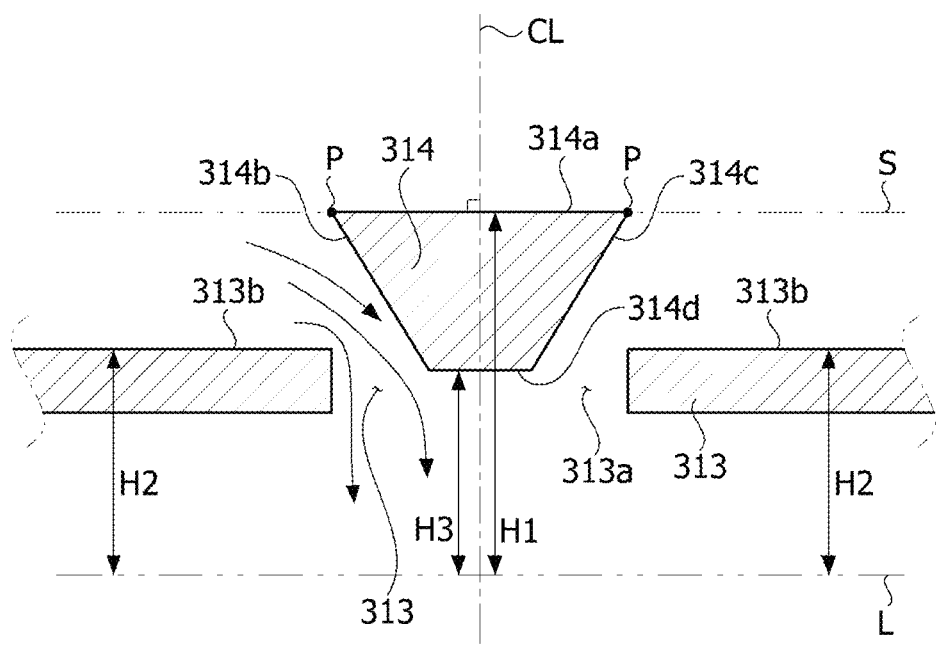
FIG. 16 is a cross-sectional view of a blade of the cover part shown in FIG. 14.

FIG. 16 is a cross-sectional view of the blade of the cover part shown in FIG. 14.

Referring to FIGS. 15 and 16, the plurality of blade 314 may be provided. The blades 314 are formed on a side surface of the propeller coupling part 311 in a radial direction and connected to the upper surface part 312. An upper surface 314a of the blade 314 may be a flat surface. Further, an upper surface 313b of the connecting part 313 may also be a flat surface.

In this case, a location of the upper surface 314a of the blade 314 may be formed at a higher level than the upper surface 313b of the connecting part 313. Specifically, in a case in which the upper surface 314a of the blade 314 and the upper surface 313b of the connecting part 313 are parallel, when a base line formed on a virtual plane which is parallel with the upper surface 314a of the blade 314 refers to L in FIG. 16, a height H1 from the base line L to the upper surface 314a of the blade 314 may be formed to be greater than a height H2 of the upper surface 313b of the connecting part 313 from the base line L.

Meanwhile, both side surfaces 314b and 314c of the blade 314 may be formed as inclined surfaces. Further, inclination directions of both side surfaces 314b and 314c of the blade 314 may be formed to be different. In addition, in a cross-sectional shape of the blade 314, both lateral sides may be formed to be symmetrical to each other on the basis of a base line CL which vertically passes through a center of a width of an upper side. That is, inclination degrees of both side surfaces 314b and 314c of the blade 314 may be formed to be the same. The above are configurations for suctioning air onto the blade 314 regardless of a rotating direction of the blade 314. When the blade 314 rotates in a clockwise direction, air located at a left side of the blade 314 passes through the through hole 313a along the inclined side surface 314b to be introduced into the motor 10 for a drone.

Figure 17:
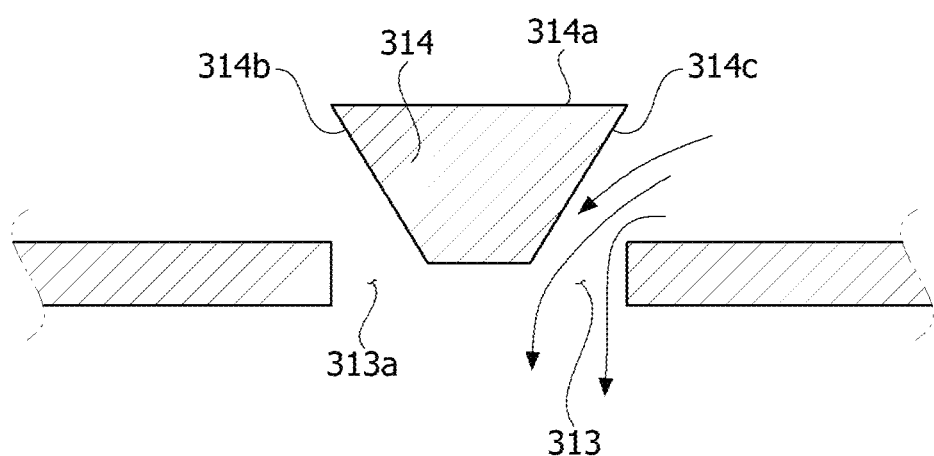
FIG. 17 is a view illustrating an air flow around the blade in a rotating direction opposite a rotating direction in FIG. 16.

FIG. 17 is a view illustrating an air flow around the blade in a rotating direction opposite the rotating direction in FIG. 16.

As shown in FIG. 17, when the blade 314 rotates in a counterclockwise direction, air located at a right side of the blade 314 is introduced through the side surface 314c of the blade 314 to pass through the through hole 313a.

Referring to FIG. 16, a lower surface 314d of the blade 314 may be formed to be lower than a location of upper surface 313b of the connecting part 313. Specifically, a height H3 from the base line L to the lower surface 314d of the blade 314 may be formed to be smaller than the height H2 of the upper surface 313b of the connecting part 313 from the base line L. The above is provided to induce the air on the blade 314 to be more efficiently introduced into the motor 10 for a drone.

Meanwhile, the upper surface 314a of the blade 314 may be formed with the upper surface 311c of the propeller coupling part 311 on the same flat surface S (see FIG. 16).

Figure 18:
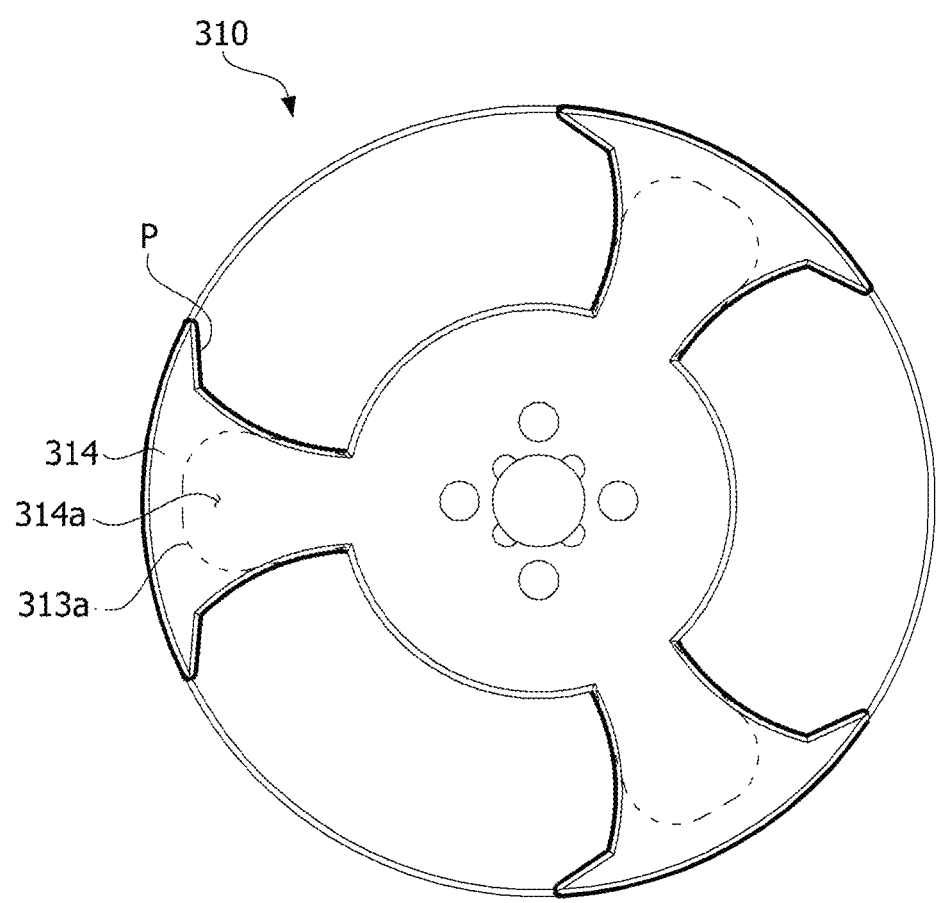
FIG. 18 is a view illustrating a blade configured to cover a through hole.

FIG. 18 is a view illustrating the blade configured to cover the through hole.

Referring to FIGS. 16 and 18, the blade 314 may be formed to cover the through hole 313a. That is, the through hole 313a may be formed to be located at the inside of an outer boundary of the upper surface 314a of the blade 314 on the basis of a circumferential surface. The above is provided to secure an air flow path for heat dissipation and prevent water or foreign substances from being introduced into the motor.

Figure 19:
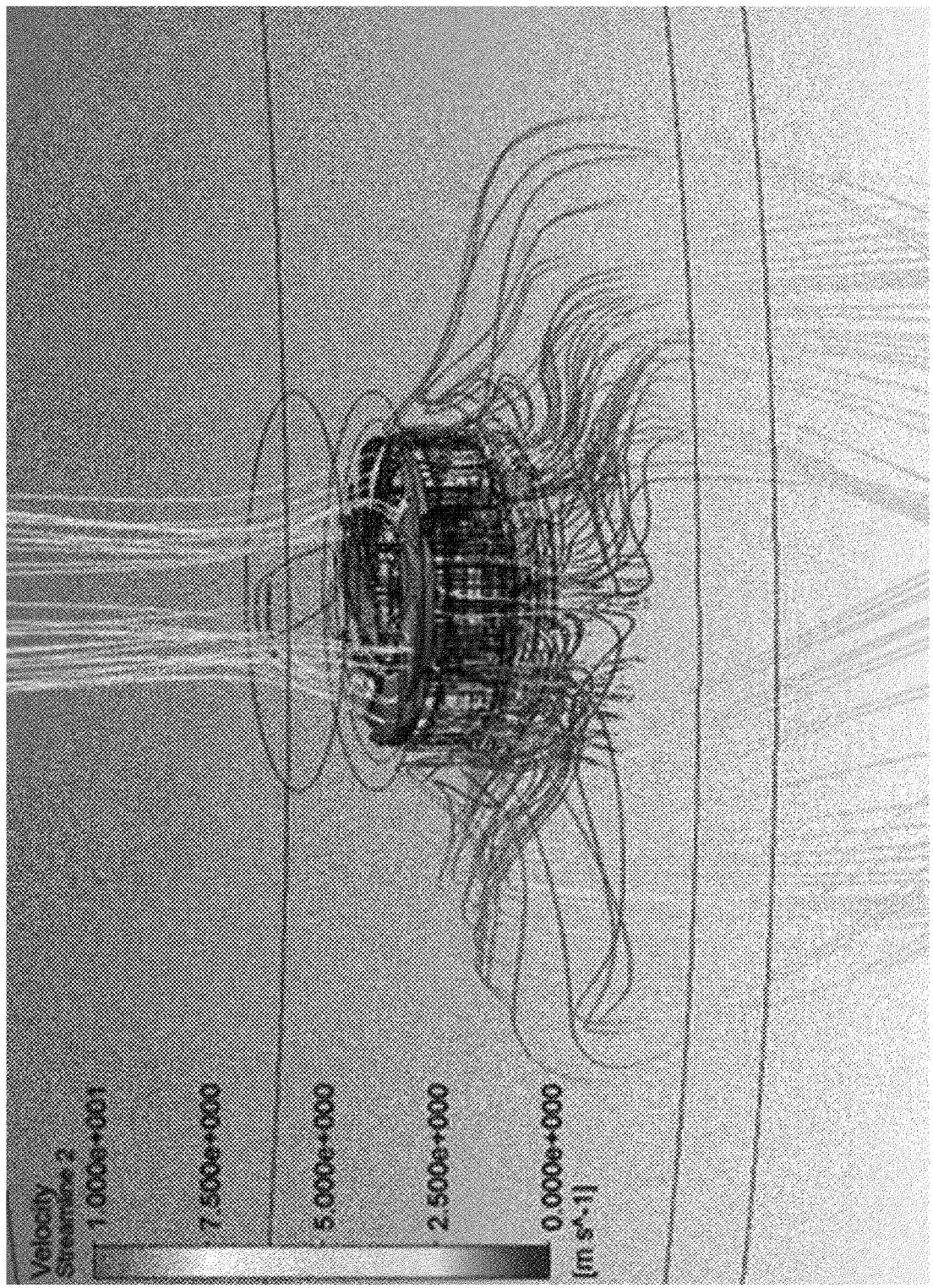
FIGS. 19 and 20 are simulation views illustrating an air flow around the motor according to the third embodiment while the motor is driven.
Figure 20:
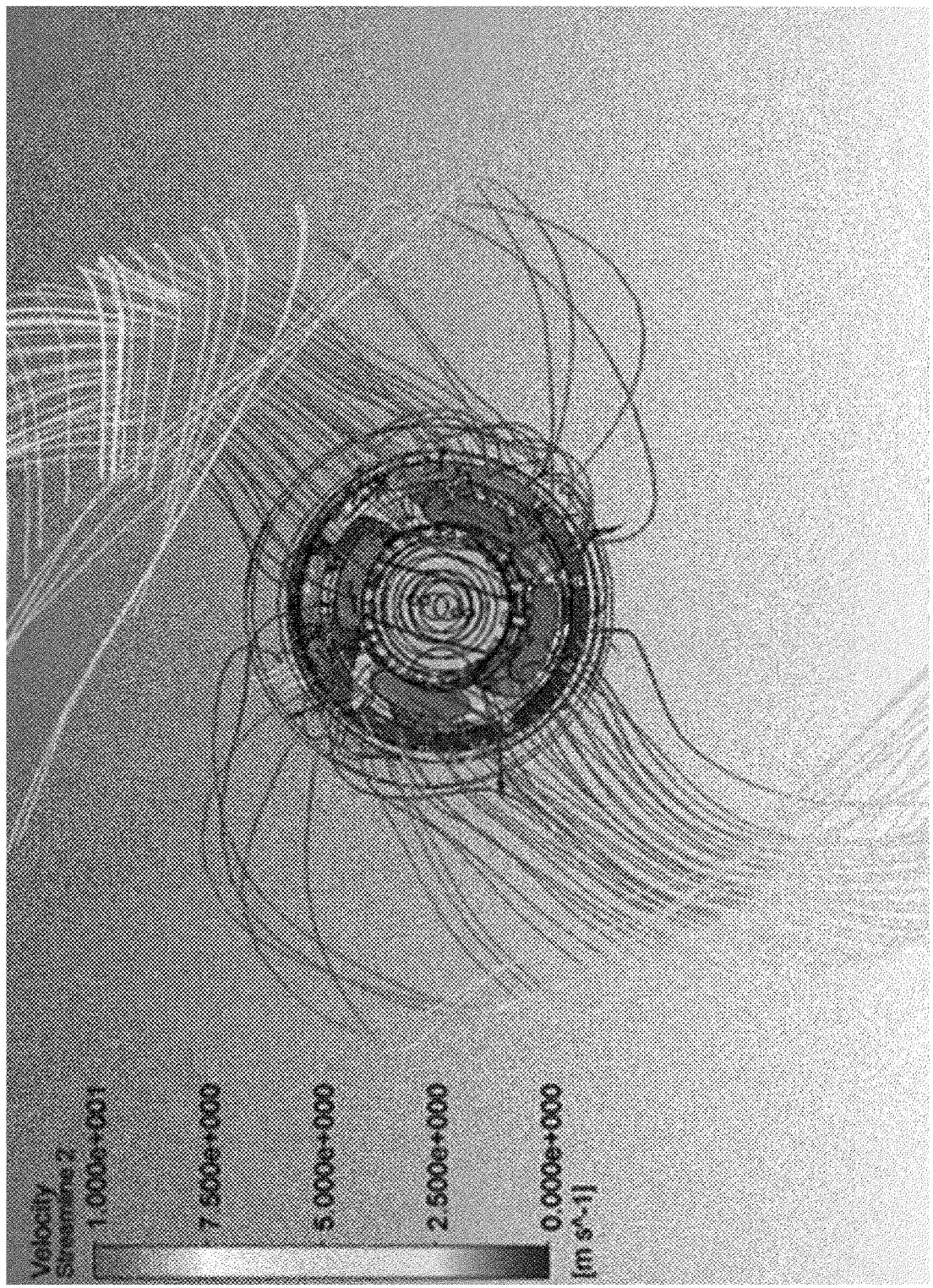

FIGS. 19 and 20 are simulation views illustrating an air flow around the motor according to the third embodiment while the motor is driven.

Referring to FIGS. 19 and 20, when the motor 10 according to the third embodiment rotates, air located on the motor 10 may be determined to be introduced into the motor 10 and discharged to a lower side of the motor 10. A descending air flow is directly introduced into the motor 10 from above the motor 10 due to rotation of the motor 10. Further, the air introduced into the motor 10 is discharged to the lower side of the motor 10. Accordingly, the motor 10 according to the embodiment may induce a descending air flow introduced into the motor 10 and then discharged to the outside of the motor so as to discharge heat generated from the inside of the motor 10 to the outside thereof.

As described above, the motor for a drone according to one embodiment of the present invention and the drone including the same have been looked over with reference to the accompanying drawings.

The above description is only an exemplary description of the technical spirit of the present invention, and various changes, various modifications, changes, and substitutions of the present invention may be performed by those skilled in the art within essential characteristics of the embodiments. Accordingly, the disclosed embodiments and the accompanying drawings of the present invention are not for limiting but for describing the technical spirit of the present invention, and the scope of the technical spirit of the present invention is not limited by the embodiments and the accompanying drawings. The scope of the present invention should be interpreted by the claims which will be described below, and the equivalents should be interpreted as being included in the claims of the present invention.

The invention claimed is:

1. A motor for a drone, comprising:
a rotary shaft;
a stator including a hole into which the rotary shaft is inserted; and
a rotor disposed at an outside of the stator, wherein the rotor includes:
  a cover part coupled to the rotary shaft to cover an upper portion of the stator,
  a body part configured to cover a side portion of the stator, and
  a magnet coupled to an inner circumferential surface of the body part, wherein the cover part includes:
    a propeller coupling part including a hole through which the rotary shaft passes, the propeller coupling part having an upper surface and a side surface coupled to the upper surface,
    an upper surface part connected to the body part,
    a plurality of connecting parts configured to connect the propeller coupling part and the upper surface part, each of the connecting parts is directly connected to the side surface of the propeller coupling part,
    a plurality of blades disposed in a radial direction from the side surface of the propeller coupling part and formed to be spaced apart from the upper surface part, each of the blades is directly connected to the side surface of the propeller coupling part, and
    a through holes are each disposed between every two adjacent ones of the connecting parts,
wherein the propeller coupling part is protruded more than the upper surface part, and
wherein the blades are protruded from the side surface of the propeller coupling part so that each of the blades is disposed on a separate one of the through holes.

2. The motor for a drone of claim 1, wherein:
each of the blades include a curved surface formed to be concave toward a separate corresponding one of the through holes.

3. The motor for a drone of claim 2, wherein:
each of the blades include a curved surface formed to be convex toward a separate corresponding one of the through holes.

4. A motor for a drone, comprising:
a rotary shaft;
a stator including a hole into which the rotary shaft is inserted; and
a rotor disposed at an outside of the stator, wherein the rotor includes:
  a cover part coupled to the rotary shaft to cover an upper portion of the stator,
  a body part configured to cover a side portion of the stator, and
  a magnet coupled to an inner circumferential surface of the body part, wherein the cover part includes:
    a propeller coupling part including a hole through which the rotary shaft passes,
    an upper surface part disposed on an outer side of the body part, and
    a plurality of blades disposed in a radial direction from a side surface of the propeller coupling part and connected to the upper surface part,
wherein an upper surface of the blade is a horizontal surface having a first side and a second side, a first side surface of the blade is coupled to the first side of the upper surface, and a second side surface of the blade is coupled to the second side of the upper surface, the first side surface of the blade is a first inclined surface, and the second side surface of the blade is a second inclined surface,
wherein the upper surface of the blade is formed to be coplanar with the upper surface part,
wherein the first side surface of the blade is located on the first side of the upper surface of the blade, and the second side surface of the blade is located on the second side of the upper surface of the blade, and
wherein an inclination direction of the first side surface of the blade is the same as an inclination direction of the second side surface of the blade.

5. The motor for a drone of claim 4, wherein:
a width of the upper surface of the blade gradually increase toward the outside thereof on the basis of a radial direction of the cover part.

6. A motor for a drone, comprising:
a rotary shaft;
a stator including a hole into which the rotary shaft is inserted; and
a rotor disposed at an outside of the stator, wherein the rotor includes:
  a cover part coupled to the rotary shaft to cover an upper portion of the stator,
  a body part configured to cover a side portion of the stator, and
  a magnet coupled to an inner circumferential surface of the body part, wherein the cover part includes:
    a propeller coupling part including a hole through which the rotary shaft passes, the propeller coupling part having an upper surface and a side surface coupled to the upper surface,
    an upper surface part connected to the body part,
    a plurality of connecting parts configured to connect the propeller coupling part and the upper surface part, each of the connecting parts is directly connected to the side surface of the propeller coupling part, and
    a plurality of blades disposed in a radial direction from the side surface of the propeller coupling part and connected to the upper surface part, each of the blades is directly connected to the side surface of the propeller coupling part,
    a through holes are each disposed between every two adjacent ones of the connecting parts,
wherein an upper surface of each of the connecting parts is a horizontal surface, and an upper surface of each of the blades is a horizontal surface, and
wherein the upper surface of each of the blades is disposed to be higher than the upper surface of each of the connecting parts.

7. The motor for a drone of claim 6, wherein:
wherein in a cross-sectional shape of one of the blades, both lateral sides are symmetrical to each other on the basis of a base line which vertically passes through a center of a width of an upper side.

8. A drone comprising:
a drone main body;
a landing part coupled to a lower part of the drone main body;
a plurality of propeller supporters configured to radially extend from the drone main body;
a motor coupled to the propeller supporter; and
a propeller coupled to the motor, wherein the motor includes a rotary shaft,
a stator including a hole into which the rotary shaft is inserted, and a rotor disposed at the outside of the stator, wherein the rotor includes:
  a cover part coupled to the rotary shaft to cover an upper portion of the stator,
  a body part configured to cover a side portion of the stator, and
  a magnet coupled to an inner circumferential surface of the body part, wherein the cover part includes:
    a propeller coupling part including a hole through which the rotary shaft passes, the propeller coupling part having an upper surface and a side surface coupled to the upper surface,
    an upper surface part connected to the body part,
    a plurality of connecting parts configured to connect the propeller coupling part and the upper surface part, each of the connecting parts is directly connected to the side surface of the propeller coupling part,
    a plurality of blades disposed in a radial direction from the side surface of the propeller coupling part and formed to be spaced apart from the upper surface part, each of the blades is directly connected to the side surface of the propeller coupling part, and
    a through holes are each disposed between every two adjacent ones of the connecting parts,
wherein the propeller coupling part is protruded more than the upper surface part, and
wherein the blades are protruded from the side surface of the propeller coupling part so that each of the blades is disposed on a separate one of the through holes.

9. A drone comprising:
a drone main body;
a landing part coupled to a lower part of the drone main body;
a plurality of propeller supporters configured to radially extend from the drone main body;
a motor coupled to the propeller supporter; and
a propeller coupled to the motor, wherein the motor includes a rotary shaft,
a stator including a hole into which the rotary shaft is inserted; and
a rotor disposed at an outside of the stator, wherein the rotor includes:
  a cover part coupled to the rotary shaft to cover an upper portion of the stator,
  a body part configured to cover a side portion of the stator, and
  a magnet coupled to an inner circumferential surface of the body part, wherein the cover part includes:
    a propeller coupling part including a hole through which the rotary shaft passes,
    an upper surface part disposed on an outer side of the body part, and
    a plurality of blades disposed in a radial direction from a side surface of the propeller coupling part and connected to the upper surface part,
wherein an upper surface of the blade is a horizontal surface having a first side and a second side, a first side surface of the blade is coupled to the first side of the upper surface, and a second side surface of the blade is coupled to the second side of the upper surface, the first side surface of the blade is a first inclined surface, and the second side surface of the blade is a second inclined surface,
wherein the upper surface of the blade is formed to be coplanar with the upper surface part,
wherein the first side surface of the blade is located on the first side of the upper surface of the blade, and the second side surface of the blade is located on the second side of the upper surface of the blade, and
wherein an inclination direction of the first side surface of the blade is the same as an inclination direction of the second side surface of the blade.

10. A drone comprising:
a drone main body;
a landing part coupled to a lower part of the drone main body;
a plurality of propeller supporters configured to radially extend from the drone main body;
a motor coupled to the propeller supporter; and
a propeller coupled to the motor, wherein the motor includes:
  a rotary shaft,
  a stator including a hole into which the rotary shaft is inserted, and
  a rotor disposed at the outside of the stator, wherein the rotor includes:
    a cover part coupled to the rotary shaft to cover an upper portion of the stator,
    a body part configured to cover a side portion of the stator, and
    a magnet coupled to an inner circumferential surface of the body part, wherein the cover part includes:
      a propeller coupling part including a hole through which the rotary shaft passes, the propeller coupling part having an upper surface and a side surface coupled to the upper surface,
      an upper surface part connected to the body part,
      a plurality of connecting parts configured to connect the propeller coupling part and the upper surface part, each of the connecting parts is directly connected to the side surface of the propeller coupling part,
      a plurality of blades disposed in a radial direction from the side surface of the propeller coupling part and connected to the upper surface part, each of the blades is directly connected to the side surface of the propeller coupling part, and
      a through holes are each disposed between every two adjacent ones of the connecting parts,
wherein an upper surface of each of the connecting parts is a horizontal surface, and an upper surface of each of the blades is a horizontal surface, and
wherein the upper surface of each of the blades is disposed to be higher than the upper surface of each of the connecting parts.

* * * * *